United States Patent
Wagner et al.

(10) Patent No.: US 11,346,268 B2
(45) Date of Patent: May 31, 2022

(54) METHOD FOR OPERATING A PARTICULATE FILTER IN AN EXHAUST AFTERTREATMENT SYSTEM OF A COMBUSTION ENGINE

(71) Applicant: Robert Bosch GmbH, Stuttgart (DE)

(72) Inventors: Alexandre Wagner, Stuttgart (DE); Benedikt Alt, Rutesheim (DE); Fabian Straub, Deutschland (DE); Thomas Baumann, Kornwestheim (DE); Christoph Schweizer, Tamm (DE); Michael Drung, Muehlacker (DE); Oliver Krannich, Tamm (DE); Rainer Maier, Stuttgart (DE); Tobias Zolg, Bermatingen (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 16/871,175

(22) Filed: May 11, 2020

(65) Prior Publication Data
US 2020/0355107 A1 Nov. 12, 2020

(30) Foreign Application Priority Data
May 9, 2019 (DE) .......................... 102019206682.8

(51) Int. Cl.
*F01N 3/00* (2006.01)
*F01N 9/00* (2006.01)
(Continued)

(52) U.S. Cl.
CPC ............. *F01N 9/00* (2013.01); *B01D 46/446* (2013.01); *F01N 3/021* (2013.01); *F01N 11/002* (2013.01);
(Continued)

(58) Field of Classification Search
CPC .......... F01N 9/00; F01N 3/021; F01N 11/002; F01N 2250/04; F01N 2560/08; F01N 2900/1411; B01D 46/446; B01D 2279/30
(Continued)

(56) References Cited

U.S. PATENT DOCUMENTS

| 2008/0110238 A1* | 5/2008 | Kariya | F01N 11/002 |
| | | | 73/23.31 |
| 2011/0162352 A1 | 7/2011 | Svensson et al. | |

(Continued)

FOREIGN PATENT DOCUMENTS

| DE | 69907174 T2 | 5/2004 |
| DE | 602004001913 T2 | 9/2007 |

(Continued)

OTHER PUBLICATIONS

English translation of German Patent Application Publication No. DE 102014220522 A1 (Apr. 14, 2016) (Year: 2016).*

*Primary Examiner* — Jason D Shanske
(74) *Attorney, Agent, or Firm* — Michael Best & Friedrich LLP

(57) ABSTRACT

A method for the operation of a particulate filter in an exhaust aftertreatment system of a combustion engine (200) with the following steps: set up (111, 116) a pressure difference model, which models a measured pressure difference ($\Delta p$) which drops across the particulate filter (210) as a function (220) of a volume flow ($\dot{V}$) through the particulate filter (210) with an offset value ($a_0$, C); measure (120) multiple measurement values (245) for the pressure difference ($\Delta p$) at different volume flows ($\dot{V}$) and solve (130) the pressure difference model as a function of the pressure difference ($\Delta p$), whereby the offset value ($a_0$, C) is also determined.

9 Claims, 4 Drawing Sheets

(51) Int. Cl.
    *F01N 3/021*    (2006.01)
    *F01N 11/00*    (2006.01)
    *B01D 46/44*    (2006.01)
(52) U.S. Cl.
    CPC ...... *B01D 2279/30* (2013.01); *F01N 2550/04* (2013.01); *F01N 2900/1602* (2013.01)
(58) Field of Classification Search
    USPC .......................................................... 60/274
    See application file for complete search history.

(56)                References Cited

U.S. PATENT DOCUMENTS

| 2019/0032585 | A1  |  1/2019 | Kelly et al. |            |
| 2019/0234285 | A1* |  8/2019 | Di Martino   | F01N 9/005 |
| 2019/0390582 | A1* | 12/2019 | Langegger    | F01N 11/007 |
| 2021/0102487 | A1* |  4/2021 | Baumann      | F01N 13/008 |

FOREIGN PATENT DOCUMENTS

| DE | 102014220522  | A1 |    4/2016 |          |
| DE | 102017218862  | A1 |    9/2018 |          |
| DE | 102017205361  | A1 |   10/2018 |          |
| DE | 102018114779  | A1 |   12/2019 |          |
| WO | WO-2014198386 | A1 * | 12/2014 | F02D 41/029 |

* cited by examiner

METHOD FOR OPERATING A PARTICULATE FILTER IN AN EXHAUST AFTERTREATMENT SYSTEM OF A COMBUSTION ENGINE

BACKGROUND OF THE INVENTION

The present invention relates to a method for operating a particulate filter in an exhaust aftertreatment system of a combustion engine, a computer program, a machine-readable storage medium and an electronic control unit.

To reduce particulate emissions, particulate filters that retain particles produced by combustion are installed in vehicles. Due to the accumulation of these particles in the particulate filter, the loading state thereof changes. Due to the exhaust volume flow, a pressure difference drops across the particulate filter, which changes due to the loading. To determine the loading of the filter, the pressure difference across the particulate filter is measured and evaluated. However, the measured pressure difference is erroneous because the sensor has an offset that changes during operation. Offset learning is only carried out in the prior art when the engine is stopped, since the measured pressure difference corresponds to the offset then.

Due to different engine states, the filter can regenerate in a driving cycle and thus reduce its loading. If a maximum loading of the particulate filter is reached, active regeneration of the particulate filter is also carried out.

In addition, the pressure difference of an empty filter is compared with that of the installed filter in order to diagnose a filter removal. In this case, the pressure difference of the empty filter is calculated with a model. The model parameters are applied in advance and are therefore identical for each filter.

SUMMARY OF THE INVENTION

The method is used for the operation of a particulate filter in an exhaust aftertreatment system of a combustion engine.

According to a preferred embodiment, the method is used for determination of an offset value of a pressure difference model of the particulate filter in the exhaust aftertreatment system of the combustion engine. The determination takes place during the operation of the combustion engine. This implies that the method is performed at different temperatures of the particulate filter and/or different pressures in the particulate filter.

According to a first step of the method, a pressure difference model is established or created, which models a measured pressure difference that drops across the particulate filter as a function of a volume flow through the particulate filter with an offset value. Alternatively, the offset mentioned here can also be called a sensor offset.

According to a second step of the method, multiple measurement values for the pressure difference are measured at different volume flows. This is carried out during the operation of the combustion engine.

According to a third step of the method, the pressure difference model is solved according to the pressure difference, whereby the offset value is also determined.

The method advantageously achieves that diagnostic functions for particulate filter removal detection can be implemented due to the high-quality pressure difference model or the offset-adjusted pressure difference signal. On the basis of the high-quality pressure difference model or the offset-adjusted pressure difference signal, conclusions can be drawn about the loading state of the filter. Here, the information about the loading state of the filter can be used to realize a control function for filtration optimization. The control function for filtration optimization can, for example, regulate a detected soot mass in the filter to a predetermined value.

Another advantage of the pressure model is that the volume flow can be used to determine a model value for the pressure difference that is less noisy than the measured value.

The pressure difference model can also be used to implement a component protection function for the filter.

According to a preferred embodiment, the function of the pressure difference is an nth order polynomial. Here, the pressure difference can be the measured pressure difference. The pressure difference can be described with the following equation:

$$\Delta p = a_n \cdot \dot{V}^n + a_{n-1} \cdot \dot{V}^{n-1} + \ldots + a_1 \cdot \dot{V} + a_0 \quad (1)$$

Here, $\Delta p$ is the measured pressure difference and the independent variable of the nth order polynomial is the volume flow $\dot{V}$. The volume flow $\dot{V}$ can be calculated from the measured mass flow $\dot{m}$, the measured or modelled temperature T and the measured or modelled absolute pressure p in the particulate filter as follows:

$$\dot{V} = \frac{\dot{m} \cdot R \cdot T}{p} \quad (2)$$

$a_0, a_1, \ldots, a_{n-1}, a_n$ are coefficients, where $a_0$ corresponds to the offset value or the sensor offset, since at $\dot{V}=0$ there is no pressure drop across the particulate filter.

The coefficients $a_0, a_1, \ldots, a_{n-1}, a_n$ are assumed to be constant for a short time, but may change, for example, when the temperature or exhaust gas viscosity or other parameters in the particulate filter change. In addition, the coefficients $a_0, a_1, \ldots, a_{n-1}, a_n$ can depend on the loading of the particulate filter.

Instead of a global approximation with a polynomial function, a local linear approximation can also be performed. For this purpose, discrete volume flow intervals can be set and then average values for pressure and volume flow can be determined for each interval. Interpolation can then be performed between the averages so that an associated pressure value can be determined for each volume flow value.

According to a preferred embodiment, following the determination of the coefficients either the offset-adjusted measured pressure difference or the modeled pressure difference is used for the loading calculation and/or the removal detection of the filter.

According to a further preferred embodiment, at least n measurement values for the pressure difference are measured at different volume flows.

In order to be able to determine the coefficients $a_0, a_1, \ldots, a_{n-1}, a_n$, and thus also to positively determine the offset value or the sensor offset, at least n equations must be established. This means that at least n different measured value pairs ($\Delta p, \dot{V}$) must be present in order to obtain a solvable equation system. The equation system can be written as follows:

$$\Delta p_1 = a_n \cdot \dot{V}_1^n + a_{n-1} \cdot \dot{V}_1^{n-1} + \ldots + a_1 \cdot \dot{V}_1 + a_0$$

$$\Delta p_2 = a_n \cdot \dot{V}_2^n + a_{n-1} \cdot \dot{V}_2^{n-1} + \ldots + a_1 \cdot \dot{V}_2 + a_0$$

$$\Delta p_n = a_n \cdot \dot{V}_n^n + a_{n-1} \cdot \dot{V}_n^{n-1} + \ldots + a_1 \cdot \dot{V}_n + a_0 \quad (3)$$

This has the advantage that the equation system can be solved, especially in the case of an nth order polynomial, According to yet another preferred embodiment, the pressure difference model or the equation system is solved recursively. This is preferably carried out by means of the least squares method (abbreviated to MKQ in German or LS in English).

Since the coefficients are determined continuously using the recursive process, they continuously adapt to the temperature and exhaust gas viscosity in the particulate filter. This allows high model accuracy to be achieved.

According to a preferred embodiment, at least two measurements for the pressure difference are averaged. This advantageously provides robust and noise-free measurement values for the measurement value pairs ($\Delta p$, $\dot{V}$). For this purpose, n different volume flow intervals can be set. Each time a measured volume flow is within one of these intervals, the pressure difference and volume flow are taken into account for the averaging of the corresponding interval. Once a minimum number of measured values have been recorded within an interval, the average value is considered to be valid and may be used to determine the coefficients. Once valid average values are available for n different intervals, the coefficients can be determined. If there are more than n valid average values, the linear equation system is overdetermined. This usually leads to a more precise determination of the coefficients by interpolating the results. For this reason, the number of valid average values can be used as a quality criterion for the coefficients and thus the offset determination.

According to a further preferred embodiment, when setting up the pressure difference model, the pressure difference that drops across the particulate filter is modeled as a function of the volume flow, the pressure and the temperature in the particulate filter. In the way it is advantageously achieved that in contrast to the aforementioned model the model already intrinsically takes into account the relevant magnitudes of the volume flow, pressure and temperature in the particulate filter and the pressure difference is optimized or fitted depending on these sizes.

According to a preferred embodiment, at least two different pressure difference models will be used.

Preferably, the function of the pressure difference is modeled by the following equation:

$$\Delta p = A' \cdot \mu \cdot \dot{V} + B \cdot \dot{V}^2 \cdot \rho + C = A' \cdot \mu_0 (T/T_0)^\nu \cdot \dot{V} + B \cdot \dot{V}^2 \cdot \rho + C = A \cdot T^\nu \cdot \dot{V} + B \cdot \dot{V}^2 \cdot \rho + C \quad (4)$$

Here A', A, B and C are coefficients, the coefficient C is also called the offset value or the sensor offset. $\mu$ is the exhaust gas viscosity, $\mu_0$ is a viscosity correlation constant. T is the modeled or measured temperature in the particulate filter, $T_0$ is the constant temperature 293 K. $\dot{V}$ is the volume flow calculated from the measured mass flow $\dot{m}$, the measured or modeled temperature and the measured or modeled absolute pressure in the particulate filter. This is carried out by means of the thermal state equation of ideal gases, which is often referred to as the general gas equation, as follows $\dot{m} = p \cdot \dot{V}/(R \cdot T)$, wherein R is the individual or specific gas constant that is assumed to be constant. $\rho$ is the density of the exhaust gas and $\nu$ is the viscosity correlation constant. From the equation $\rho \dot{V} = \dot{m}$, it follows that $\rho \dot{V} = \dot{m}$ at constant density $\rho$. With this equation as well as the thermal state equation of ideal gases, the pressure difference can be rewritten as follows:

$$\Delta p = \square \cdot \square^\square \cdot \dot{V} + \square \cdot \dot{V} \cdot \dot{m} + \square = \square \cdot \square^\square \cdot \dot{V} + \square \cdot \dot{V}^2 \cdot \square/(\square \cdot \square) + \square \quad (5)$$

This alternative model has the advantage that not only the volume flow, but also the pressure and temperature in the particulate filter are taken into account in the model.

Here, the pressure p in the particulate filter can be determined using the pressure difference and the pressure $p_{DS}$ downstream of the particulate filter with the following equation:

$$p = p_{DS} + 0.5 \Delta p \quad (6)$$

The pressure $p_{DS}$ downstream of the particulate filter can be modeled as a function of the volume flow. As an alternative, the pressure $p_{DS}$ downstream of the particulate filter can be equated with the ambient pressure $p_{env}$, since the following applies: $p_{DS} - p_{env} = \Delta p_{muf}$, wherein $\Delta p_{muf}$ is the pressure drop across the silencer and is very small compared to the absolute pressures $p_{DS}$ and $p_{env}$.

Thus, equation 7 can be written approximately as follows:

$$\Delta p_{muf} \ll p_{env}, p_{DS} - p_{env} \approx 0, p_{DS} \approx p_{env}, p = p_{DS} + 0.5 \Delta p \approx p_{env} + 0.5 \Delta p \quad (7)$$

According to a further preferred embodiment, the volume flow, the pressure difference, the temperature in the particulate filter and a mass flow through the particulate filter are determined at at least three different operating points of the combustion engine. Since the mass flow $\dot{m}$, the pressure difference $\Delta p$, the temperature T and the volume flow $\dot{V}$ can be measured, modeled or calculated from the other variables and are thus known, the coefficients A and B and the offset value C can be determined by determining said variables at at least three different operating points of the combustion engine. As a result, a system of equations is advantageously obtained which can be solved with the least squares method, for example.

For a new filter, such a method can be carried out at the end of production. In this way, the filter-individual variation of parameters A and B can be taken into account and the learned values can be stored in a non-volatile memory. If the coefficients A, B and C are determined, the pressure difference for each operating point can be determined using the model.

According to yet another preferred embodiment, a maximum allowable volume flow is determined for a predetermined maximum allowable pressure difference using the solved pressure difference model.

For example, the maximum allowable volume flow can be calculated according to equation 8:

$$\dot{V}_{max} = -(A \cdot T^{\nu+1} \cdot R)/2Bp + \sqrt{[((A \cdot T^{\nu+1} \cdot R)/2Bp)^2 - (C - \Delta p_{max}) \cdot RT/B_p]} \quad (8)$$

The maximum allowable volume flow calculated in this way can then be adjusted by means of internal engine measures.

Component protection of the particulate filter can be advantageously achieved in this way.

Here, the value of the maximum allowable volume flow can have deviations, because the current values are used for the pressure p and the temperature T in the filter and not the values that prevail at the time of the maximum volume flow. However, the fact that the maximum volume flow can be determined continuously allows the updated temperature and pressure to be taken into account for each calculation, which means that the deviations can be reduced.

Furthermore, the pressure model can be used to implement a control function with which the filtration of the particulate filter can be optimized.

The computer program is set up to perform every step of the method, especially when it is run on an electronic control unit or computing device. This allows the method to be implemented in a conventional control unit without having to make structural changes. For this purpose, the computer program is stored on a machine-readable storage medium. By running the computer program on a conventional electronic control unit, the electronic control unit is obtained which is set up to carry out a method for operating a particulate filter in an exhaust aftertreatment system of a combustion engine.

BRIEF DESCRIPTION OF THE DRAWINGS

Exemplary embodiments of the invention are represented in the drawings and are explained in more detail in the following description.

DETAILED DESCRIPTION

Figure 1:
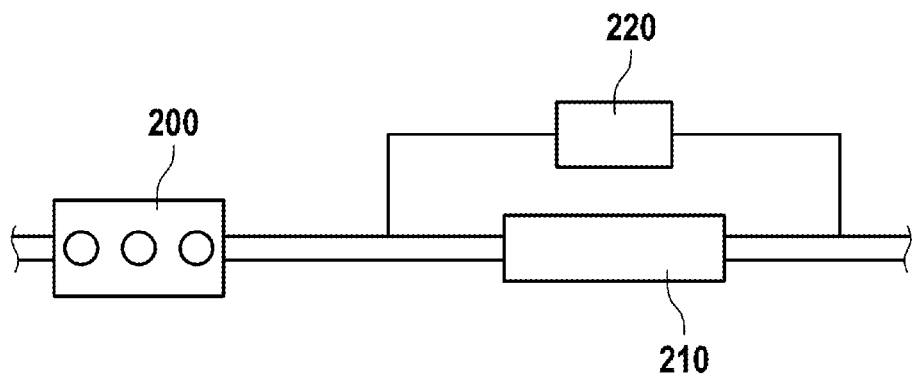
FIG. 1 shows a schematic representation of a combustion engine with a particulate filter, which is used in a method according to an embodiment of the invention.

FIG. 1 shows a particulate filter 210 arranged downstream of a combustion engine 200. The pressure difference Δp that drops across the particulate filter 210 is modelled by a function 220.

Figure 2:
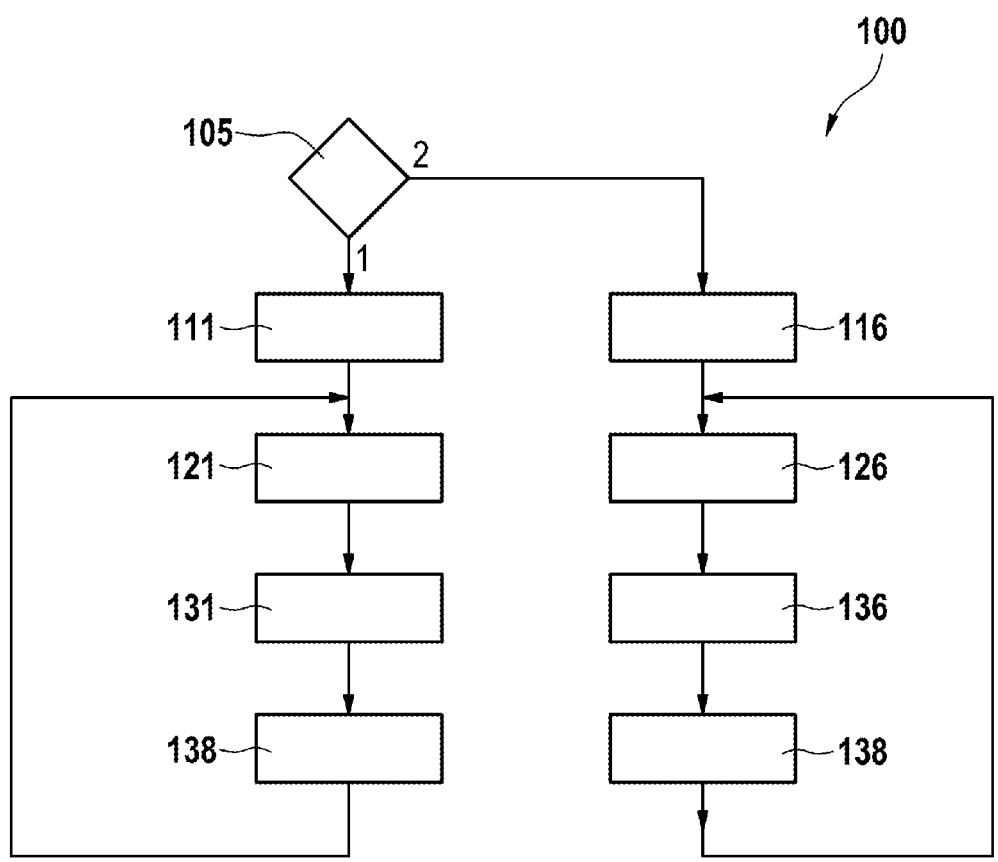
FIG. 2 shows a schematic flow diagram of a method according to an embodiment of the invention.

FIG. 2 shows a method 100 for the operation of the particulate filter 210 in an exhaust aftertreatment system of the combustion engine 200, which determines in particular an offset value of a pressure difference model during the operation of the combustion engine.

In a first step 105, a query is made as to whether a first or a second differential pressure model should be chosen.

If the first differential pressure model is selected, the method proceeds with step 111, if the second differential pressure model is selected, the method proceeds with step 116.

In step 111, a pressure difference model is established, which models a measured pressure difference which drops across the particulate filter 210 as a function of a volume flow $\dot{V}$ through the particulate filter 210 with an offset value $a_0$, wherein the function 220 of the pressure difference Δp is an nth order polynomial of the volume flow $\dot{V}$ according to equation (4).

In the next step 121, multiple measured values for the pressure difference p are measured at different volume flows $\dot{V}$.

In the next step 131, the pressure difference model or the equation system is solved. Here, the offset value $a_0$ is also determined.

After step 131, in step 138 a maximum allowable volume flow $\dot{V}_{max}$ for a predetermined, maximum allowable pressure difference $\Delta p_{max}$ is determined using the solved pressure difference model. The engine controller ensures that the maximum allowable volume flow $\dot{V}_{max}$ is not exceeded.

After step 138, the method returns to step 121, wherein the multiple measurement values for the pressure difference Δp are measured again at different volume flows $\dot{V}$. Here, the new measurements for the pressure difference Δp at different volume flows $\dot{V}$ are averaged with the previously determined measurement values. Furthermore, the pressure difference model is solved recursively. Also, the maximum allowable volume flow $\dot{V}_{max}$ is determined iteratively.

In step 116, a pressure difference model is established, which models a measured pressure difference which drops across the particulate filter 210 as a function of a volume flow $\dot{V}$ through the particulate filter 210 with an offset value C, wherein the function 220 of the pressure difference Δp is given by equation 5. Here, the pressure difference Δp is modeled as a function of the volume flow $\dot{V}$, the pressure p and the temperature T in the particulate filter.

In the next step 126, the volume flow $\dot{V}$, the pressure difference Δp, the temperature T in the particulate filter 210 and a mass flow $\dot{m}$ through the particulate filter 210 are measured at six different operating points of the combustion engine 200.

In the next step 136, the pressure difference model or the equation system is solved. The offset value C is also determined.

After step 136, a maximum allowable volume flow $\dot{V}_{max}$ is determined in step 138 for a predetermined, maximum allowable pressure difference $\Delta p_{max}$ using the solved pressure difference model. In the engine controller, it is ensured that the maximum allowable volume flow $\dot{V}_{max}$ is not exceeded.

After step 138, the method returns to step 126, wherein the multiple measurement values for the pressure difference Δp are measured again at different volume flows V. Here, the new measurements for the pressure difference Δp at different volume flows $\dot{V}$ are averaged with the previously determined measurement values. Furthermore, the differential pressure model is solved recursively. Also, the maximum allowable volume flow $\dot{V}_{max}$ is determined.

Figure 3:
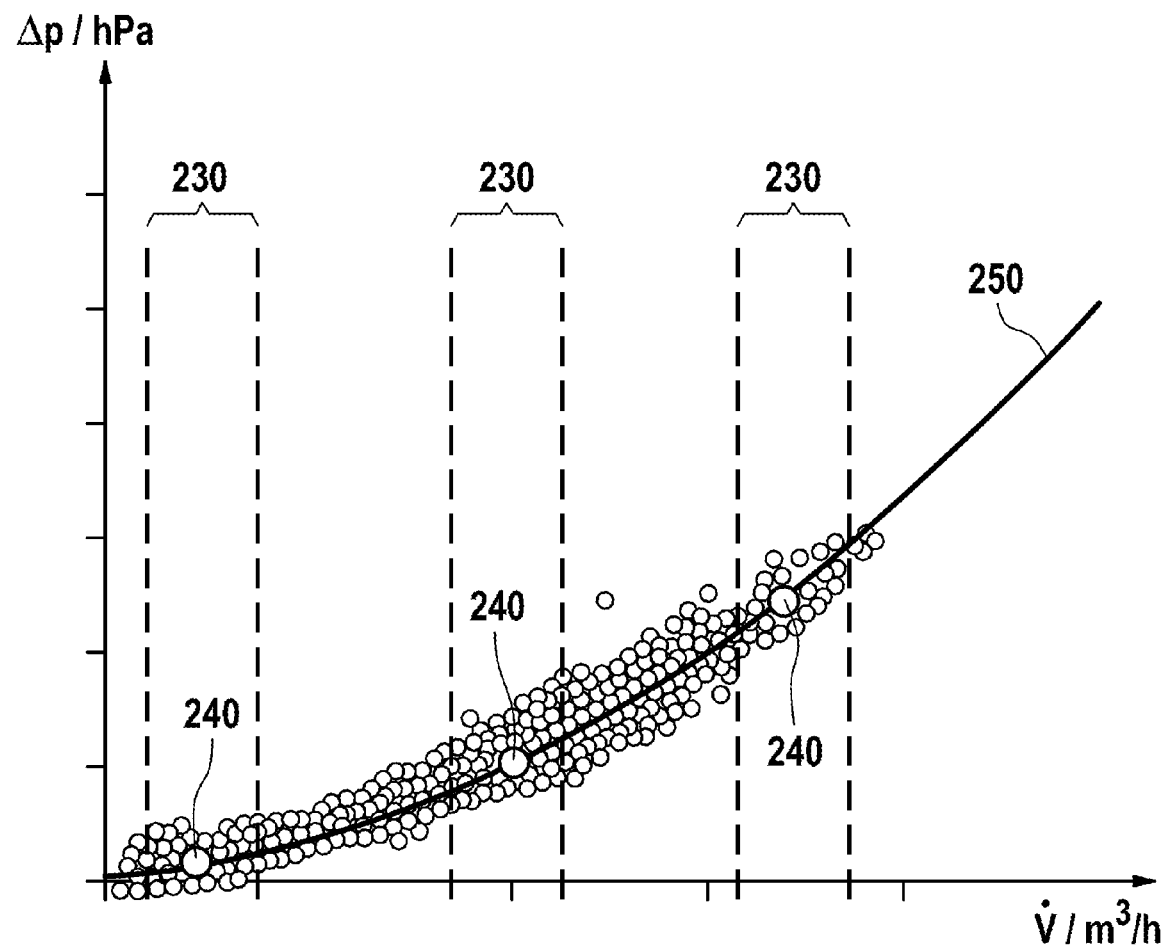
FIG. 3 shows averaging for measurements of the pressure difference and the volume flow based on volume flow intervals according to an exemplary embodiment of the invention.

FIG. 3 shows measurement points for the pressure difference Δp measured across the particulate filter 210 as a function of the measured volume flow $\dot{V}$. Here, the pressure difference Δp is measured in units of hectopascals (hPa) and the volume flow $\dot{V}$ in units of cubic meters per hour (m³/h). In FIG. 3, three volume flow intervals 230 are defined. If a measured volume flow $\dot{V}$ is within one of these three volume flow intervals 230, the pressure difference Δp and volume flow $\dot{V}$ are taken into account for the averaging of the corresponding volume flow interval 230. Once a predetermined minimum number of measured values has been recorded within a volume flow interval 230, this average is considered to be valid and may be used to determine the coefficients. For the three volume flow intervals 230, three valid average values 240 are plotted, using which a fit curve 250 of function 220 of the first pressure difference model was drawn.

Figure 4:
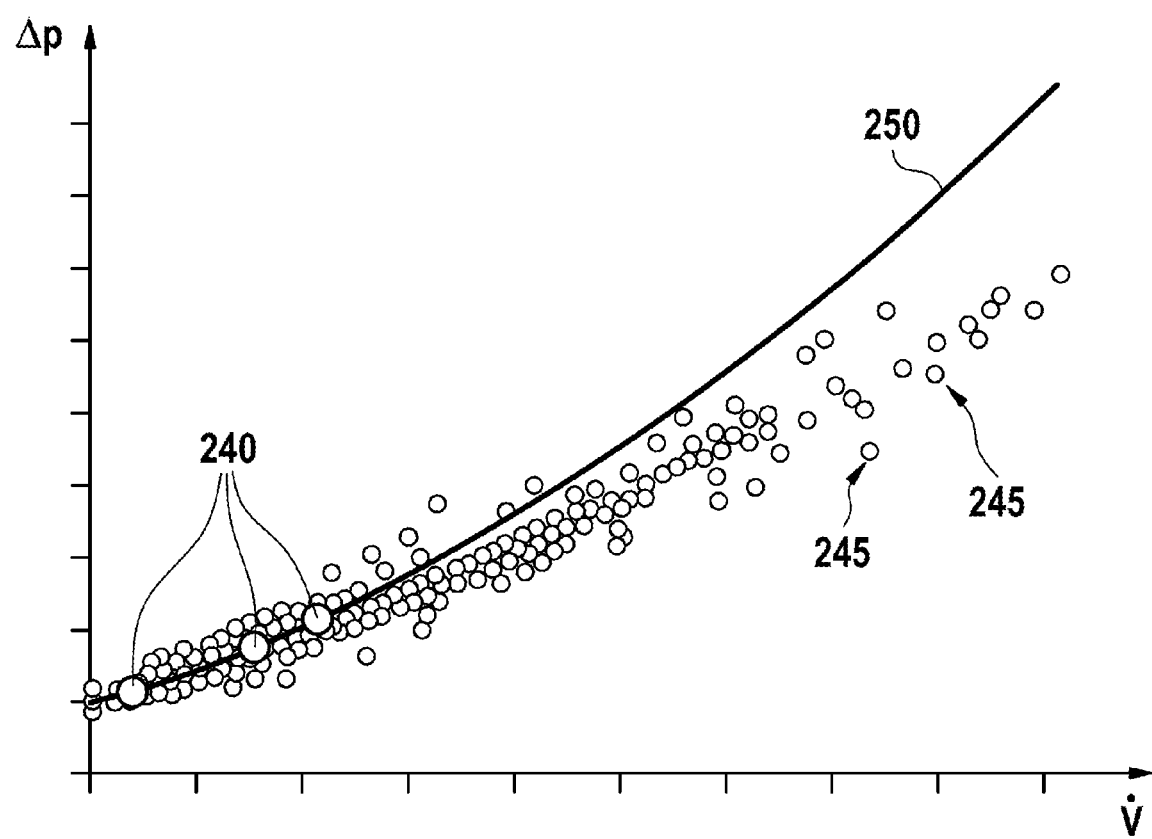
FIGS. 4 and 5 illustrate an increase in model quality through a larger number of averaged measurement values.
Figure 5:
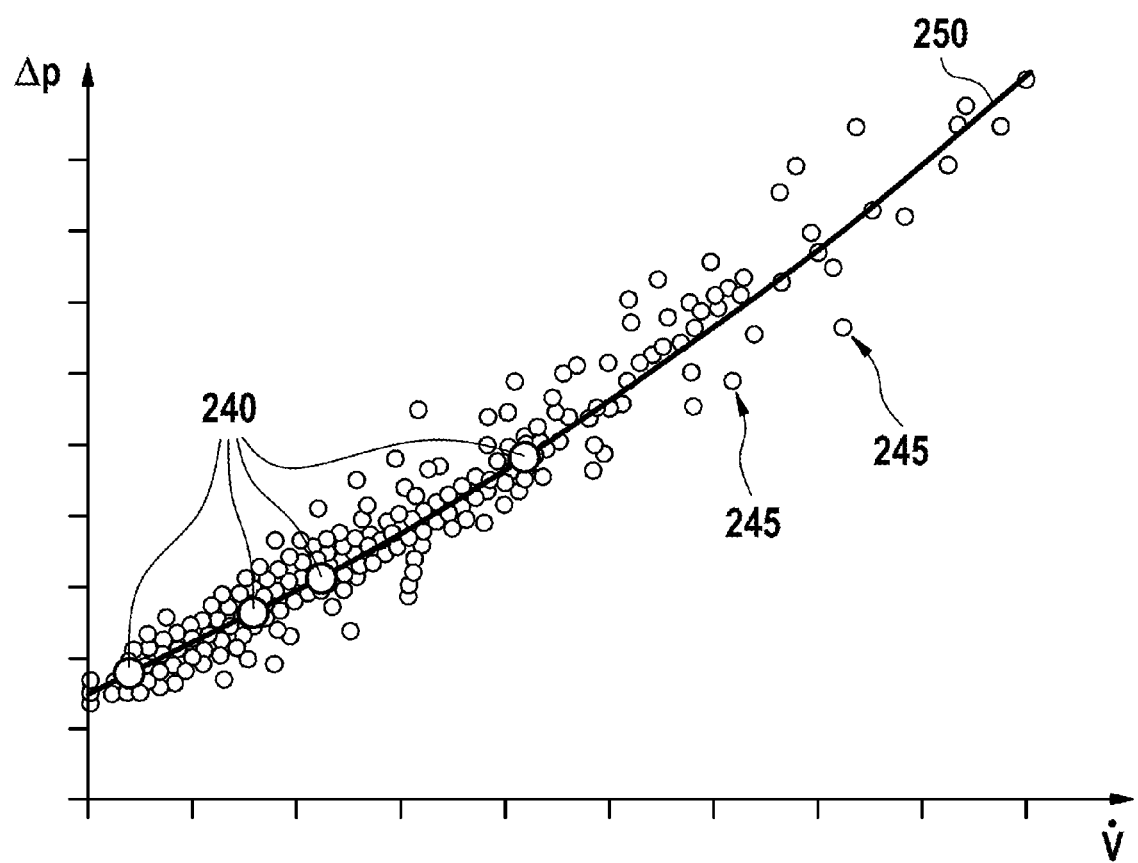

FIGS. 4 and 5, as well as FIG. 3, show measurement points for the pressure difference Δp measured across the particulate filter 210 as a function of the measured volume flow $\dot{V}$. In FIG. 4, the case is shown in which only three average values 240 were used for the fit curve 250, whereas in FIG. 5 four average values 240 were used. It can be clearly seen that the fit curve 250 in FIG. 5 is much better matched to the measured values 245 than in FIG. 4.

The invention claimed is:
1. A method (100) for the operation of a particulate filter in an exhaust aftertreatment system of a combustion engine (200), the method comprising:
setting up (111, 116), in an electronic computer, a pressure difference model, which models a measured pressure difference (Δp) which drops across the particulate filter (210) as a function (220) of a volume flow (V) through the particulate filter (210) with an offset value (ao, C);

measuring, via a sensor, (120) multiple measurement values (245) for the pressure difference (Δp) at different volume flows (V);
solving (130), via the electronic computer, the pressure difference model as a function of the pressure difference (Δp), whereby the offset value (ao, C) is also determined; and,
controlling operation, via a controller, of the particulate filter based on the pressure difference (Δp) and the offset value (ao, C),
wherein the pressure difference (Δp) that drops across the particulate filter (210) is modelled as a function of the volume flow (V), a pressure (p), and a temperature (T) in the particulate filter (210), and the pressure difference (Δp) is modelled by the following equation:

$$\Delta p = A \cdot T^v \cdot V + B \cdot V^2 \cdot p + C$$

wherein Δp is the pressure difference (Δp), A, B and C are coefficients, wherein the coefficient C is the offset value, T is the temperature in the particulate filter (210), V is the volumetric flow (V) through the particulate filter (210), p is the density of the exhaust gas, and v is a constant exponent.

2. The method (100) according to claim 1, wherein the function (220) of the pressure difference (Δp) is an nth order polynomial.

3. The method (100) according to claim 2, wherein at least n measurement values (245) for the pressure difference (Δp) can be measured at different volume flows (V).

4. The method (100) according to claim 1, wherein the pressure difference model is solved recursively.

5. The method (100) according to claim 1, wherein at least two measurements for the pressure difference (Δp) are averaged.

6. The method (100) according to claim 1, wherein the volume flow (V), the pressure difference (Δp), the temperature (T) in the particulate filter (210) and a mass flow (m) through the particulate filter (210) are determined at at least three different operating points of the combustion engine (200).

7. The method (100) according to claim 1, wherein a maximum allowable volume flow ($V_{max}$) is determined for a predetermined, maximum allowable pressure difference ($\Delta p_{max}$) using the solved pressure difference model.

8. A non-transitory, machine-readable storage medium containing instructions that when executed on a computer cause the computer to control operation of a particulate filter in an exhaust aftertreatment system of a combustion engine (200), by:
setting up (111, 116) a pressure difference model, which models a measured pressure difference (Δp) which drops across the particulate filter (210) as a function (220) of a volume flow (V) through the particulate filter (210) with an offset value (ao, C);
measuring, via a sensor, (120) multiple measurement values (24S) for the pressure difference (Δp) at different volume flows (V);
solving (130) the pressure difference model as a function of the pressure difference (Δp), whereby the offset value (ao, C) is also determined; and,
controlling operation of the particulate filter based on the pressure difference (Δp) and the offset value (ao, C),
wherein the pressure difference (Δp) that drops across the particulate filter (210) is modelled as a function of the volume flow (V), a pressure (p), and a temperature (T) in the particulate filter (210), and the pressure difference (Δp) is modelled by the following equation:

$$\Delta p = A \cdot T^v \cdot V + B \cdot V^2 \cdot p + C$$

wherein Δp is the pressure difference (Δp), A, B and C are coefficients, wherein the coefficient C is the offset value, T is the temperature in the particulate filter (210), V is the volumetric flow (V) through the particulate filter (210), p is the density of the exhaust gas, and v is a constant exponent.

9. An electronic control unit configured to
control operation of a particulate filter in an exhaust aftertreatment system of a combustion engine (200), by:
setting up (111, 116) a pressure difference model, which models a measured pressure difference (Δp) which drops across the particulate filter (210) as a function (220) of a volume flow (V) through the particulate filter (210) with an offset value (ao, C);
measuring, via a sensor, (120) multiple measurement values (245) for the pressure difference (Δp) at different volume flows (V);
solving (130) the pressure difference model as a function of the pressure difference (Δp), whereby the offset value (ao, C) is also determined, and
controlling operation of the particulate filter based on the pressure difference (Δp) and the offset value (ao, C),
wherein the pressure difference (Δp) that drops across the particulate filter (210) is modelled as a function of the volume flow (V), a pressure (p), and a temperature (T) in the particulate filter (210), and the pressure difference (Δp) is modelled by the following equation:

$$\Delta p = A \cdot T^v \cdot V + B \cdot V^2 \cdot p + C$$

wherein Δp the pressure difference (Δp), A, B and C are coefficients, wherein the coefficient C is the offset value, T is the temperature in the particulate filter (210), V is the volumetric flow (V) through the particulate filter (210), p is the density of the exhaust gas, and v is a constant exponent.

* * * * *